United States Patent
Babel et al.

(10) Patent No.: US 7,201,811 B2
(45) Date of Patent: *Apr. 10, 2007

(54) LARGE DIAMETER DOMES AND METHODS OF MANUFACTURING SAME

(75) Inventors: Henry W. Babel, Huntington Beach, CA (US); Douglas J. Waldron, Fountain Valley, CA (US); Ronaldo Reyes de Jesus, Huntingdon Beach, CA (US); William F. Bozich, Huntingdon Beach, CA (US)

(73) Assignee: The Boeing Company, Chicago, IL (US)

( * ) Notice: Subject to any disclaimer, the term of this patent is extended or adjusted under 35 U.S.C. 154(b) by 149 days.

This patent is subject to a terminal disclaimer.

(21) Appl. No.: 10/658,598

(22) Filed: Sep. 8, 2003

(65) Prior Publication Data

US 2004/0079454 A1 Apr. 29, 2004

Related U.S. Application Data

(63) Continuation-in-part of application No. 09/935,271, filed on Aug. 22, 2001, now Pat. No. 6,660,106.

(51) Int. Cl.
*B23K 20/12* (2006.01)
(52) U.S. Cl. .................... 148/535; 228/112.1
(58) Field of Classification Search ............ 148/519, 148/521, 535; 228/112.1
See application file for complete search history.

(56) References Cited

U.S. PATENT DOCUMENTS

| | | | |
|---|---|---|---|
| 3,969,917 A | 7/1976 | Waterfall | |
| 4,247,346 A | 1/1981 | Maehara et al. | |
| 4,320,644 A | 3/1982 | Fischer | |
| 5,305,505 A | * 4/1994 | Ruhlman | 86/56 |

(Continued)

FOREIGN PATENT DOCUMENTS

JP 2001-1059 * 1/2001

(Continued)

OTHER PUBLICATIONS

*ASM Materials Engineering Dictionary*, edited by J.R. Davis, ASM, 1992, p. 19.*

(Continued)

*Primary Examiner*—George Wyszomierski
(74) *Attorney, Agent, or Firm*—Klein, O'Neill & Singh, LLP

(57) ABSTRACT

The present invention relates to methods of making large spin blanks out of pieces of aluminum sheet or plate joined by friction stir welding to provide plate blank sizes greater than 156 inch (396 cm) in diameter. Blank sizes greater than 209 inch diameter enable manufacturing possibilities for large one-piece spun parts instead of constructing large structures from pieces. This also applies to sheet, except that the maximum width obtainable is 139 inches (353 cm). The availability of large blank sizes, particularly for sheet, permits the use of traditional spinning where bending is the predominant method of metal movement rather than stretching and spinning. As the present invention is a very cost effective approach, it provides a method for producing significantly more economical spin blanks between 156 and 209 inches in diameter than are obtainable for a single piece blank.

14 Claims, 1 Drawing Sheet

U.S. PATENT DOCUMENTS

| | | | |
|---|---|---|---|
| 5,460,317 | A | 10/1995 | Thomas et al. |
| 5,597,529 | A | 1/1997 | Tack |
| 5,620,652 | A | 4/1997 | Tack et al. |
| 5,697,511 | A | 12/1997 | Bampton |
| 5,697,544 | A | 12/1997 | Wykes |
| 5,758,999 | A | 6/1998 | Geise |
| 5,769,306 | A | 6/1998 | Colligan |
| 5,794,835 | A | 8/1998 | Colligan |
| 5,810,949 | A | 9/1998 | Chakrabarti et al. |
| 5,811,755 | A | 9/1998 | McGee et al. |
| 5,813,592 | A | 9/1998 | Midling et al. |
| 5,862,975 | A | 1/1999 | Childress |
| 5,971,247 | A | 10/1999 | Gentry |
| 5,971,252 | A | 10/1999 | Rosen et al. |
| 5,972,524 | A | 10/1999 | Childress |
| 5,975,406 | A | 11/1999 | Mahoney et al. |
| 6,003,755 | A | 12/1999 | Shah et al. |
| 6,006,569 | A | 12/1999 | Shrayer et al. |
| 6,070,784 | A | 6/2000 | Holt et al. |
| 6,199,419 | B1 | 3/2001 | Shrayer et al. |
| 6,199,745 | B1 | 3/2001 | Campbell et al. |
| 6,660,106 | B1 * | 12/2003 | Babel et al. ............ 148/527 |
| 6,722,285 | B2 * | 4/2004 | Nakamura et al. ....... 105/392.5 |

FOREIGN PATENT DOCUMENTS

JP   2001-001059 A * 1/2001

OTHER PUBLICATIONS

*Offshore*, Mar. 1996, "Friction stir welding method improves quality, productivity".

*Aviation Week and Space Technology*, Jul. 20, 1998, "Boeing Plans EELV/Delta 4 Horizontal Launch Processing".

*Research Reports: 1996 NASA/ASEE Summer Faculty Fellowship Program*, Oct. 1, 1996, "Process Model for Friction Stir Welding".

*American Machinist*, Mar. 1994, "Aluminum weld process eliminates distortion".

TWI, Apr. 28, 1998, "Friction Stir Welding—Applications".

TWI (Published in Welding and Metal Fabrication, 2000, vol. 68, No. 7, Jul./Aug., pp. 12-14 by DMG World Media UK Ltd.), "Bringing aerospace welding specifications up to standard".

TWI, "Friction Stir Welding—Intellectual Property Rights".

Reusable Launch Vehicle: Technology Development and Test Program (1995); "Reusable Cryogenic Tank System"; http://www.nap.edu/openbood/0309054370/html/28.html.

E. Sperlich et al.; Proceedings of the Int. Symp. on Advanced Materials for LIghtweight Structures, ESTEC.; Mar. 1994; "Effective Manufacturing of Launcher Structural Components by Introduction of Alternative Forming Concepts and Materials"; pp. 455-460.

Zankl; Nov. 4, 1996; "Freigabe fur das sechsseitige s/w—Prospekt spinformed Tankdomes".

Amtsgericht Augsburg.

Space Technology; "Weight Optimized Spinformed Tankdomes for Large Launch Vehicles".

Proctor; Aviation Week & Space Technology; May 10, 1999; "Exports Fuel Japan's Aerospace Sales"; pp. 17.

Inside Delta; Jul. 1999 vol. 3—No. 7; "Big Deliveries for a Big Rocket".

MAN Technologie AG; Jul. 2000; "Propellant Tanks—AI Li-Domes".

* cited by examiner

LARGE DIAMETER DOMES AND METHODS OF MANUFACTURING SAME

This application is a continuation-in-part of application Ser. No. 09/935,271, filed Aug. 22, 2001 now U.S. Pat. No. 6,660,106 entitled Methods of Manufacture of Large Diameter Domes, now allowed, which is commonly assigned and herein expressly incorporated by reference.

BACKGROUND OF THE INVENTION

This invention relates to methods of making large spin-blanks out of pieces of aluminum sheet or plate joined by friction-stir-welding, to provide plate sizes greater than 156 inches in diameter and sheet sizes greater than 139 inches in width. One particular application for such large spin-blanks is the making of large diameter domes for tanks such as liquid fuel rocket tanks.

Advancements in satellites, and the enhancements to telecommunications and other services that sophisticated satellites make possible, have dramatically increased the number of commercial satellites being launched. As each launch is an expensive event, there has been a trend toward increasing the number of features and components on satellites, allowing multiple users to share the costs and benefits of the satellite launch. Increased features have resulted in an increase in the size of these satellites, and consequently the size of the launch vehicles required to carry these satellites into their operational orbit. Generally, satellite launch vehicles are multi-stage rockets, with each stage including its own fuel tank, comprising a cylindrical body having a domed leading end. It is in the manufacture of these larger rocket domes that current manufacturing methods fall short. A number of rocket manufacturers have elected to use spun domes when the blank size is sufficient. The commercial aircraft industry also uses large size spun parts for some if its applications, such as an aircraft engine intake, which comprises a half toroidal shape.

Spun parts, such as rocket domes, have typically been fabricated from single blanks of aluminum alloys that are hot spun over mandrels to form the desired shape. Common mandrel spin forming methods include clamping a blank between a rotatable spindle and a die, or mandrel, corresponding to the shape to be formed. The clamped assembly is then rotated and the blank is heated while a tool, such as a spinning roller, is used to apply pressure, progressively, to a small area of the metal blank, thereby causing the small area to deform in the direction of the pressure. As the metal blank rotates, a circumferential band of the blank is progressively deformed and, by moving the spinning roller in a radial direction with respect to the rotating metal blank, the desired shape is produced.

Traditionally, spun parts have been manufactured by the mandrel spinning process from blanks having a surface area that is greater than or equal to the surface area of the domes to be spun. This process results in a dome having the desired diameter and a substantially constant material thickness. Traditional hot mandrel spinning methods have been effective, as long as the surface area of the necessary blank was smaller than the largest commercially available blank diameter. However, to manufacture spun parts using traditional mandrel spinning techniques would require a circular blank with an outside diameter well in excess of the maximum commercially available blank size. The largest plate mill in the world, an Alcoa mill in Davenport, Iowa., can currently provide plate widths up to 209 inches (531 cm).

Despite these prior art systems, there remains a need in the art for a less costly and more robust way to fabricate spin-blanks larger than 209 inches in diameter for large diameter tank domes and aircraft applications. The cost of developing and producing a wider width mill for the limited production available is not considered a viable possibility. Therefore, a method of joining less expensive standard width sheets or plates is required to provide spin blanks for either traditional spinning or methods such as are described in U.S. Pat. No. 6,199,419 to Shrayer et al., herein expressly incorporated by reference.

Fusion welding has been considered in the past, but has never developed into a production process for a variety of reasons. First, the high strength 7000 series alloys used extensively in the aircraft and aerospace industries are normally considered to be unsuitable for fusion welding. Second, fusion welding is viewed as a high cost process because of the number of weld passes required (for example, 2.5 inch thick 2219 plate would normally require six or more weld passes). Third, there are considerable associated costs incurred in inspecting each pass, as well as great difficulty in controlling the quality and defect level of fusion welds. Fourth, there is considerable potential of tearing the blank during spinning. Shrayer et al. acknowledge, in col. 2, line 67 and col. 3, line 1, the high cost of fusion welded blanks, and thus teach away from such an approach. Thus, for all of the foregoing reasons, fusion welded blanks have not transitioned into production.

Solid-state joining where no melting occurs circumvents the issues associated with fusion welding. However, prior to 1991, this technique was not developed for creating a joint along the length of two butted plates, but rather had been essentially restricted to joining parts that could be rotated and pushed together. A new form of solid state joining or welding, friction-stir welding, was invented by the Welding Institute in England in around 1991, and patented as U.S. Pat. No. 5,460,317 by Thomas et al. This '317 patent is herein expressly incorporated by reference. The solid state joining process taught in the '317 patent is being used in production in the aerospace industry for the joining of fully heat-treated aluminum alloys for making the longitudinal joints of cylindrical sections of tanks for expendable launch vehicles. Friction-stir welding has not, however, heretofore been considered for creating a joint in annealed (O temper) or as-rolled (F temper) aluminum. Current practice is to spin in the annealed temper.

The availability of plate blank sizes greater than 209 inches in diameter would create advantageous manufacturing possibilities for large one-piece spun parts instead of constructing large structures from pieces. This also applies to sheet except that the maximum width available is well under 209 inches. The availability of large blank sizes, particularly for sheet, would permit the use of stretching and spinning, instead of the current practice of bending as the predominant method of metal movement, with greatly advantageous results.

SUMMARY OF THE INVENTION

The present invention provides a method for creating spin blanks greater than 209 inches in diameter for plate, or greater than approximately 139 inches wide, for sheet, by joining aluminum sheet or plate using friction-stir-welding. It is an enabling technology for providing blank sizes greater than 209 inches in diameter for plate and 139 inches for sheet, which permits consideration of spinning very large one-piece units, such as a 27 foot in diameter rocket dome.

The present invention is applicable to all aluminum alloys, as friction-stir-welding can join them all successfully. Blanks made in this manner with the appropriate heat treatment, prior to spinning, can be spun using traditional spinning practices, or as described by Shrayer et al. '149 for one-piece, unwelded plates, wherein the plates are first stretched to a larger size, and then spun. The inventors have found that there is no greater risk of tearing blanks fabricated in accordance with the present invention during spinning as there is for a one-piece homogenous blank. Such blanks are particularly useful for forming large diameter hemispheric domes for the fuel and oxidizer tanks of launch systems and for aircraft applications such as a half-torus for a commercial aircraft engine. Prior to spinning, the friction stir weld joint can be left as-fabricated, and the blanks spun, or the joint can be partially or completely annealed prior to spinning. The preferred option for blank sizes that exceed available annealing oven sizes is to anneal the two plates prior to joining and spinning, with the joint in the as-fabricated condition.

The inventive method includes the joining together by friction stir welding of aluminum sheets or plates that are smaller than the largest premium sizes available, thereby permitting the use of standard sized sheets or plates at substantially lower cost. For example, in the size range of 156 to 209 inch wide plate, there is only one mill that provides the plates, at a substantial premium cost. Friction stir welded spin blanks thus provide an economic alternative to a one-piece blank. There are two aluminum producers currently who can produce 156 inch or less wide plate, so there is more competitive pricing at or below a width of 156 inches.

Any practical combination of plates or sheet may be joined to form a blank. The two starting plates may be rectilinear, or, in another example, there may be four plates that are friction stir welded together to make the spin blank. Preferably, the sheets to be joined are greater than 0.030 inches thick. However, any plate thickness suitable for successful friction stir welding is acceptable. At the time of this application, annealed or as-rolled aluminum plates 0.25 to 2.5 inches thick are joinable by means of friction stir welding.

Special heat treatments may be required prior to spinning, at intermediate points during the spinning operation, or prior to solution heat treatment to ensure that the required design strengths are achieved in the weld regions after solution heat treatment and aging. The required heat treatments, if any, are alloy and process dependent. Current practice for spinning of plate is to use a blank in the annealed temper. For ease of friction stir welding, making the joint in the annealed or as-rolled temper is preferred. If fully heat treated plates are joined, the blank must be annealed after joining. This presents a problem, in that there are size limitations with respect to the availability of suitably sized ovens for accomplishing the annealing step.

More particularly, the present invention describes an economical method of making spin blanks greater than a predetermined size, comprising steps of providing at least two pieces of material having abutting edges, friction stir welding the two pieces together along the abutting edges to form a blank, and spin forming the blank into a desired article. Preferably, any number and size of material pieces are joined by friction stir welding to provide the required blank size, and the material pieces comprise an aluminum alloy. In a particularly preferred embodiment, the material pieces comprise sheet having a thickness of 0.030 inches (0.762 mm) or greater, and in a second particularly preferred embodiment, the material pieces comprise plates having a thickness of 0.250 inches or greater to a maximum thickness that can be friction stir welded. In one disclosed method, the blank is annealed after friction stir welding, prior to spinning.

The material pieces, comprising plates or sheets, may be friction stir welded in any heat treat condition to a maximum size of available annealing ovens that will accommodate a circular blank. The blank may be annealed after friction stir welding and prior to spinning.

The invention, together with additional features and advantages thereof, may best be understood by reference to the following description taken in conjunction with the accompanying illustrative drawing.

DESCRIPTION OF THE PREFERRED EMBODIMENT

Figure 1:
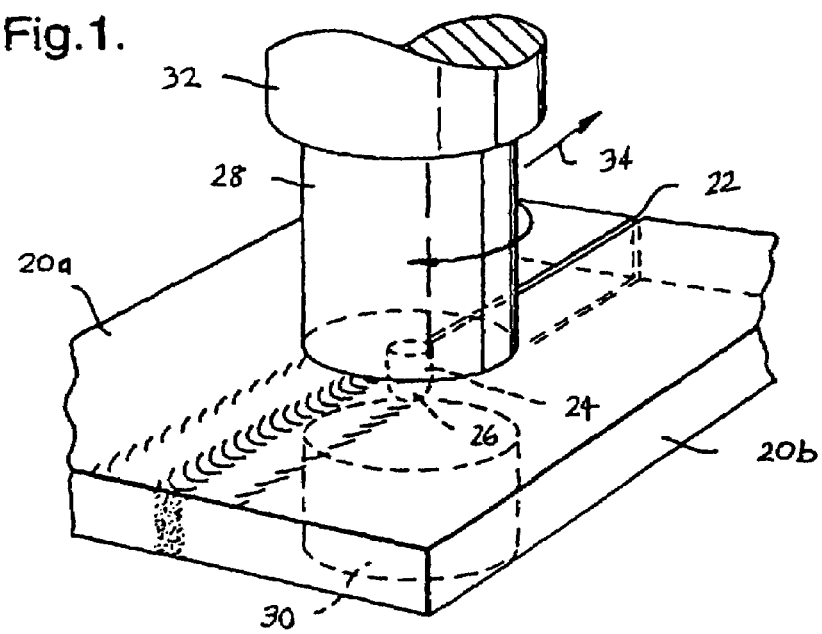
FIG. 1 is a perspective view of a conventional friction stir welding apparatus as it forms a butt joint between two plates.

The present invention provides a method of producing reliable, low-cost spin blanks greater than 156 inch (396 cm) diameter for plate and 139 inch (353 cm) width for sheet. Such blanks can be used to produce large diameter domes for rocket fuel tanks, for example, or for aircraft applications. The method comprises providing at least two blanks of aluminum sheet or plate material and friction stir welding them together to form a large spin blank then being spin formed into the desired configuration with or without simultaneous stretching. The invention can be practiced using all aluminum alloys though certain aluminum alloys are preferred. Likewise, the number of blanks and their dimensions may vary without departing from the scope of the invention. Finally, numerous different friction stir welding techniques and apparatuses may be used.

Friction welding is based on the principle of generating a sufficient amount of heat to plasticize adjacent surfaces and to bring the surfaces together under pressure. The frictional heat is produced in inertial welding by rotating pieces in contact. Friction "stir" welding, on the other hand, utilizes a rotating non-consumable probe or pin that is plunged into the butting two pieces to be joined and then traversed along the length as described in U.S. Pat. No. 5,460,317. The pin is of a harder material than the work pieces to be joined, and relative cyclic movement of the pin generates the frictional forces to plasticize the workpiece material. Because of this movement of the non-consumable pin, the method has been named friction stir welding, with the pin "stirring" the material. Both friction and friction stir welding are solid state joining techniques formed without exceeding the temperature at which the base metals will melt. For aluminum alloys, such as 2219, the maximum temperature reached is around 700° F. (371° C.), with the melting temperature being approximately 400° F. (204° C.) higher.

In a conventional butt joint, for example, the pin spins and travels along the interface between the adjacent or "faying" work piece surfaces to create the plasticized weld joint.

There are many variations in the specific approach used for making the friction-stir-weld with two major approaches, a single-sided pin tool and a two-sided or bobbin type pin tool. Any of these variations may be suitable for joining aluminum sheet or plate with the establishment of the proper processing parameters. For a single sided pin tool, the two work pieces are placed on a backing surface and are tightly held together to prevent separation during the friction stir welding process. Further, a stationary shoulder surrounding the moving pin applies forging pressure to the top surface around the faying surfaces on the opposite side from the backing surface to prevent the plasticized material from extruding out of the joint and to provide additional frictional heating. The result is a relatively smooth and void-free joint with the complete absence of cracks and porosity present in fusion welded joints.

In the conventional example shown in FIG. 1, a pair of aluminum alloy sheets or plates 20a, 20b butt together at a joint line 22. A non-consumable probe 24 of steel having a narrow central, cylindrical portion 26 positioned between upper and lower forging sections 28, 30 is brought to the edge of the joint line 22 between the plates 20a, 20b. A motor 32 rotates the probe 24 while the probe traverses in a direction 34 and while the plates are held against lateral movement away from the probe 24. The rotating probe 24 produces a local region of highly plasticized material around the steel "pencil" portion 26 while top and bottom constraints are provided by the sections 28, 30. It should be noted that the constraining faces of the sections 28, 30 are adapted to be closely fitted onto the plates 20a, 20b to be joined to avoid loss of material from the plasticized zone. The rotating probe 24 forces the plasticized material downward and backward in its "wake". When the probe 24 translates between the faying surfaces at the joint line 22, plasticized material flows from the front of the probe to the rear. The single-sided probe extends almost to the bottom of the material to be joined, but cannot extend all the way through so as to avoid contact with the lower forging section 30, which might pull support tooling debris into the weld.

An alternative friction stir welding tool that may be used replaces the lower forging section 30 seen in FIG. 1 with a flat base surface. The plates 20a, 20b lie flat on top of the base surface, which provides the backing reaction force against which the forging force of the upper forging section 28 is applied.

Planar circular blanks are used for spinning into domes to provide an axis-symmetric spinning mass and so that the final rim of the dome is also circular. Friction stir-welded blanks can be cut into the required disk shape the same as for one piece homogeneous blank in a number of ways such as high pressure water jet cutting, sawing, machining as on a boring mill, torch cutting, etc., a couple of which are exemplified in FIGS. 2A and 2B.

Figure 2A:
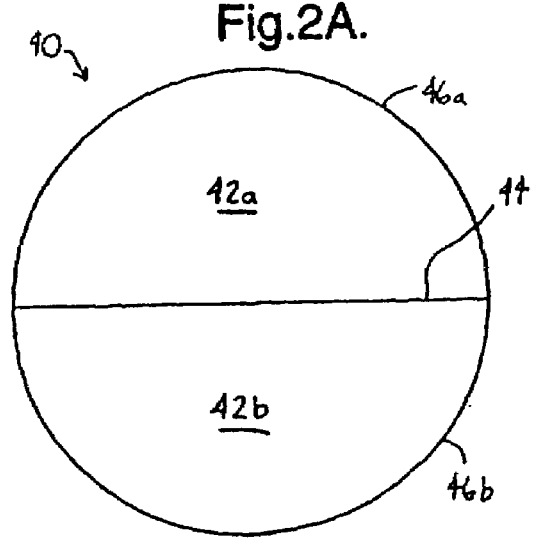
FIG. 2A is a plan view of two semi-circular plates friction stir welded together to form a dome blank suitable for spinning.

FIG. 2A illustrates a circular blank 40 suitable for spinning into a dome and consisting of two semi-circular plates 42a, 42b joined along their juxtaposed radial edges with a friction stir welded joint line 44. It should be noted that the arcuate edges 46a, 46b of the plates 42a, 42b may be cut prior to welding the joint line 44, or after the circular blank 40 is fabricated.

Figure 2B:
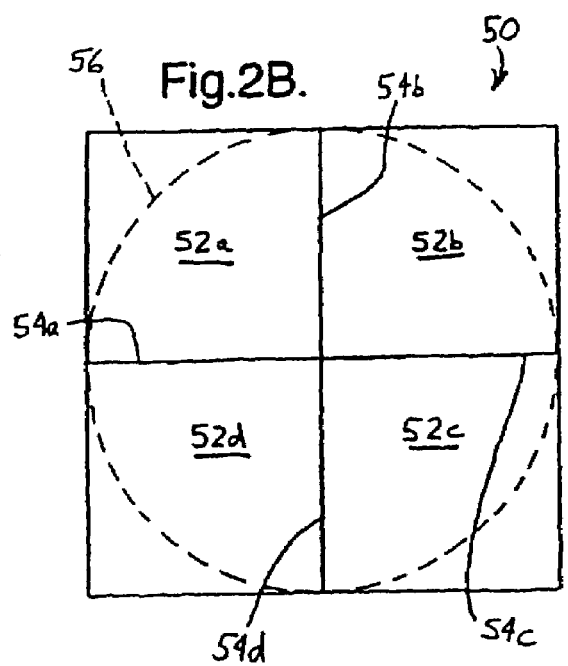
FIG. 2B is a plan view of four square plates friction stir welded together to form a larger square, and an outline of a circular dome blank suitable for spinning.

FIG. 2B shows a square blank 50 consisting of four square plates 52a, 52b, 52c, 52d, each connected along two side edges to two other plates with two of the illustrated friction stir welded joint lines 54a, 54b, 54c, 54d. A circular outline 56 of a blank suitable for spinning into a dome is shown, which blank may be cut out of the larger square blank 50. Alternatively, quarter circle edges may be cut from each of the smaller plates 52a, 52b, 52c, 52d prior to their combination into the larger blank 50.

The friction-stir-welded circular disk blank can be spun into a dome using various conventional spin-forming tools and procedures. For example, Spincraft (500 Iron Horse Park, North Billerica, Mass. 01862) provides spin forming systems specifically designed to form launch vehicle rocket domes. Keystone Engineering Company (1444 South San Pedro Ave., Los Angeles, Calif. 90015) also supplies spin forming tools suitable for forming domes out of the blanks of the present invention.

Optionally, the circular disk blank may also be stretched as it is spun to increase its size. U.S. Pat. No. 6,199,419, which is herein expressly incorporated by reference, discloses a system for both stretching and spinning a circular blank into a larger dome. Stretching is accomplished by heating the spinning blank, applying compressive forces along a select band of the blank, and progressively moving the compressed band radially outwardly on the blank. Fusion-welding techniques such as electron beam welding, tungsten arc welding, or laser welding may all be suitable for joining plates to make the blank under the right conditions, but the costs and risks are much higher than with friction stir welded blanks.

The spin blanks provided by this present invention may be used to form larger domes or other spun geometries than previously were available at a lower cost. While the formation of large domes from a single piece of aluminum alloy have been disclosed, those earlier processes required the largest starting blanks available at a premium cost (partly because of the cost of shipping such large pieces). The present invention permits smaller, lower cost plates to be first joined and then spun to form the largest domes currently required. The smaller plates may be rolled at a number of mills around the country, resulting in competitive pricing. The smaller plates require no premium for shipping to the site where they are joined, preferably in the vicinity or at the spinner's location. The present process can be used to form domes of up to 5 meters in diameter, and theoretically larger, limited only by the capacity of the spin form tooling currently available and supporting processing equipment.

Exemplary blank dimensions are 209 inches (531 cm) in diameter and 2.5 inches (6.35 cm) thick. Such a blank may be more economically formed of two or more plates, as mentioned above. The same sized dome as can be formed by stretching and spinning can be formed by traditional spinning a blank of around 272 inches (691 cm) diameter with a thinner blank so the volume of the two are the same.

The thickness of the plates used to form the circular blanks ranges from 0.25 inches (6.35 mm) up to about 2.5 inches (6.35 cm). The thickness depends upon the final product requirements, and also on whether stretching will be used, which results in some reduction in thickness. It also depends on the advancement of the technology with friction stir welding to weld thicker sections. The solid state joint provided by the friction stir welding process is free of defects when the correct processing conditions are used with exceptionally fine grains in the stirred nugget. This essentially eliminates the potential for cracks or tearing of the material during the spinning and/or stretching steps with no greater risk than a one-piece homogenous blank.

To help ensure the highest quality material properties in the weld joint after solution heat treatment and aging, some aluminum alloys may require a special heat treatment before spinning, some may require intermediate heat treatments, and some may require a special heat treatment prior to solution heat treatment or any combination of these three heat treatments. These special heat treatments help ensure that the strengths required for the design are obtained after heat treatment in weld regions that are non-cold worked as well as in the cold worked areas. In most cases, the strengths and elongation specified in MIL-HDBK-5 are achieved. For blank sizes larger than available annealing ovens, the preferred embodiment is annealing of the plates prior to friction stir welding and spinning in the as-welded condition without the requirement for any subsequent special heat treatments.

One specific heat treatment for Al 2219 plates friction stir welded together includes friction stir welding of as-rolled plate (F temper), annealing the blank per standard procedures, spinning and stretching using standard procedures, and solution-heat treatment and aging per standard procedures. The alloy 2219 does not require any special heat treatment procedures other than the pre-spinning anneal.

Accordingly, although an exemplary embodiment of the invention has been shown and described, many changes, modifications, and substitutions may be made by one having ordinary skill in the art without departing from the spirit and scope of the invention.

What is claimed is:

1. A method of making spin blanks greater than a predetermined size, comprising:
   providing at least two pieces of material having abutting edges;
   annealing the at least two pieces of material;
   friction stir welding the at least two pieces of annealed material together along the abutting edges to form a blank; and
   spin forming the blank into a desired article, including clamping the blank, applying heat thereto, and rotating the blank while applying pressure to selected regions thereof using a tool.

2. The method as recited in claim 1, wherein any number and size of material pieces are joined by friction stir welding to provide the required blank size.

3. The method as recited in claim 1, wherein the material pieces are an aluminum alloy.

4. The method as recited in claim 3, wherein the material pieces comprise sheet having a thickness of 0.030 inches (0.762 mm) or greater.

5. The method as recited in claim 3, wherein the material pieces comprise plate having a thickness of 0.250 inches or greater to a maximum thickness that can be friction stir welded.

6. The method as recited in claim 1, wherein the blank is annealed after friction stir welding, prior to the spinning spin forming step.

7. The method as recited in claim 1, wherein the material pieces are friction stir welded in any heat treat condition to form a blank having a maximum size of available annealing ovens of said maximum size will accommodate a circular blank.

8. The method as recited in claim 7 wherein the blank is annealed after friction stir welding and prior to the spinning spin forming step.

9. The method as recited in claim 1 wherein the blank includes a joint, and the spin forming step is performed blank spun with the joint in the as-welded condition.

10. The method as recited in claim 1, wherein said at least two pieces comprise plates, and said blank has a diameter greater than 209 inches.

11. The method as recited in claim 1, wherein said at least two pieces comprise sheets, and said blank has a width greater then 139 inches.

12. An economical method of making spin blanks greater than a predetermined size, comprising:
   providing at least two pieces of material having abutting edges;
   annealing the at least two nieces of material;
   friction stir welding the at least two pieces of annealed material together along the abutting edges to form a blank;
   annealing the blank; and
   spin forming the blank into a desired article.

13. The method as recited in claim 12, wherein the friction stir welding step is performed with the material in a fully heat treated condition.

14. The method as recited in claim 12, wherein the friction stir welding step is performed with the material in an as-rolled condition.

* * * * *